United States Patent [19]
Eshelman et al.

[11] 3,734,403
[45] May 22, 1973

[54] THERMOSTATIC VACUUM VALVE

[75] Inventors: Robert W. Eshelman; Waysl Ohar, both of Ann Arbor, Mich.

[73] Assignee: Chrysler Corporation, Highland Park, Mich.

[22] Filed: Sept. 17, 1971

[21] Appl. No.: 181,498

[52] U.S. Cl. ...................236/87, 236/101, 337/111
[51] Int. Cl. ...........................................G05d 23/275
[58] Field of Search.........................236/87, 101, 86; 137/525.3; 337/111; 251/367

[56] References Cited
UNITED STATES PATENTS

| | | |
|---|---|---|
| 3,506,194 | 4/1970 | Resseguie.............................236/87 |
| 2,906,840 | 9/1959 | Ulanet..................................337/360 |
| 2,819,365 | 1/1958 | Epstein............................337/111 X |
| 1,604,487 | 10/1926 | Scovel, Jr. .......................251/367 X |
| 3,181,788 | 5/1965 | Norman............................236/87 X |

Primary Examiner—William F. Wayner
Assistant Examiner—W. E. Tapolcai, Jr.
Attorney—Oliver F. Arrett

[57] ABSTRACT

A temperature responsive vacuum modulating valve having an enclosed bimetal temperature sensitive element supported at both ends for improved operation and calibration, the overall valve design exhibiting improved thermal responsivity.

9 Claims, 5 Drawing Figures

Patented May 22, 1973

INVENTORS
Robert W. Eshelman
BY Wayst Ohar

Talburtt & Baldwin
ATTORNEYS.

THERMOSTATIC VACUUM VALVE

BACKGROUND OF THE INVENTION

This invention relates to valves and more particularly to thermostatic valves for controlling vacuum by means of a bimetal valve closure member.

Valves of this type are typically used for thermally modulating the input air into air cleaner systems in automotive engines. Such systems may have a pivoted damper door in the air intake to the air cleaner which is controlled by a vacuum motor and a thermostatic valve of the subject type.

It is an object of this invention to provide an inexpensive, reliable, simply manufactured and assembled thermostatic valve having a minimum number of parts which may be more readily and cheaply manufactured. The thermostatic valve also exhibits improved thermal response, improved modes of operation and improved features as described hereinbelow.

Present air cleaner thermostatic vacuum valves usually incorporate a cantilevered bimetal supporting a plunger; the plunger controls the air flow through an orifice or bleed port into a vacuum flow chamber of the valve body. In this type valve when the plunger is unseated from the bleed port, the cantilevered bimetal tends to vibrate like a reed, sometimes producing an audible buzzing sound. One attempt to inhibit the the buzzing has comprised the incorporation of a silicone fluid pot in the plunger mounting to dampen the vibration of the bimetal. Other designs presently on the market have no damping feature in so far as is known and usually produce the objectionable buzzing sound.

It is also to be noted that the above described cantilevered bimetal is mounted on the outside of the vacuum flow chamber and therefore requires some protective cover, which adds to the expense of the valve.

Another objection to the prior art designs lies in the adjustment screw which has been found to be extremely sensitive to small amounts of adjustment. The motion of the plunger in most cases is typically about 4 or 5 times that of the motion produced at the adjusting screw.

The present improved design is, among other things, intended to eliminate the vibration of the bimetal and to reduce the sensitivity of the valve to adjustment.

Moreover, it is also an object of this design to provide a valve which is more thermally responsive and one which is easier to manufacture and cheaper, due to the use of fewer parts in the design.

SUMMARY OF THE INVENTION

The above and other objects are accomplished by a design which includes an elongated flat bimetal element enclosed within the valve vacuum flow chamber. In its preferred form the bimetal is mounted to the interior top of the valve body thus providing a desirable heat exchange relationship with the surrounding environment due to the intimate contact therebetween. The bimetal is supported at or near both ends with a central portion thereof exposed to a small opening or orifice in the center of the valve body top. One end of the bimetal is fixedly secured to the top while the other end presses against an adjustment screw carried by the top for calibration purposes. Any change in temperature causes a deflection or bowing movement in the bimetal toward or away from the orifice thus producing a slight amount of horizontal motion at the end of the bimetal where it contacts the adjustment screw. This causes the bimetal to drag across the mounting surface of the screw thus dampening any vibration of the bimetal. The calibration of the valve is accomplished by adjusting the depth at which the screw protrudes into the vacuum flow chamber through the top of the valve body. Since the screw is positioned to one side of the valve orifice while the bimetal is fixedly secured to the other side, the adjustment sensitivity decreases from the 4 or 5 to 1 ratio typical in the prior art valves to about ½ to 1 in the preferred form of the subject invention.

The decreased adjustment sensitivity decreases the difficulty encountered in adjusting the part during manufacture, thereby lowering the manufacturing cost. Any slight movement of the adjustment screw after calibration is amplified if the adjustment sensitivity is greater than 1 to 1. This makes the unit more susceptible to loss of calibration. An adjustment sensitivity of ½ to 1 produces a part that is inherently more stable.

Due to the exposure of the central portion of the bimetal member to the jet-like flow of air through the small orifice or bleed port in the top of the valve body, the thermal responsivity of this design is improved particularly in further view of the fact that the bimetal is attached to a relatively large radiating surface, i.e., the valve body.

This type of mounting arrangement for the bimetal element has made it unnecessary to provide a valve body with relatively large openings therein to allow the circulation of ambient air over the bimetal as in the prior art. In other words, this design allows the bimetal to be substantially enclosed and therefore protected, the only opening into the vacuum flow chamber of the valve being the relatively small orifice or bleed port located immediately above the bimetal member. Previous prior art devices have relied on the bimetal being substantially exposed to the ambient air in order to obtain the desirable thermal response.

The bimetal supported at both ends as disclosed herein and in intimate contact with an orifice plate or a portion of the valve body also permits the use of a much thinner bimetal than has previously been possible. This provides several advantages. For example, bimetal material is a relatively expensive material. The lighter the material (less mass), the more economical the part is to produce. Also, the thinner bimetal has less thermal mass and responds more rapidly to temperature changes. The deflection of a bimetal is inversely proportional to its thickness. A thin bimetal is therefore more sensitive to temperature changes than a thick one.

DESCRIPTION OF THE PREFERRED EMBODIMENT

Figure 1:
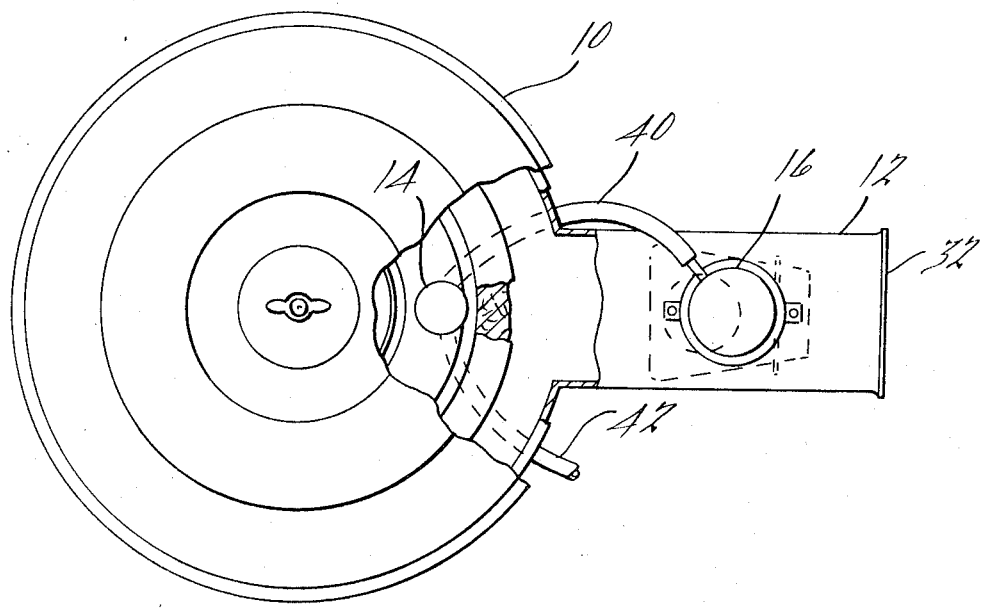
FIG. 1, is a top view, partially cut away, showing an air cleaner incorporating a thermally modulated air cleaner system for automotive engines of the type incorporating a thermostatic vacuum valve according to the invention.
Figure 2:
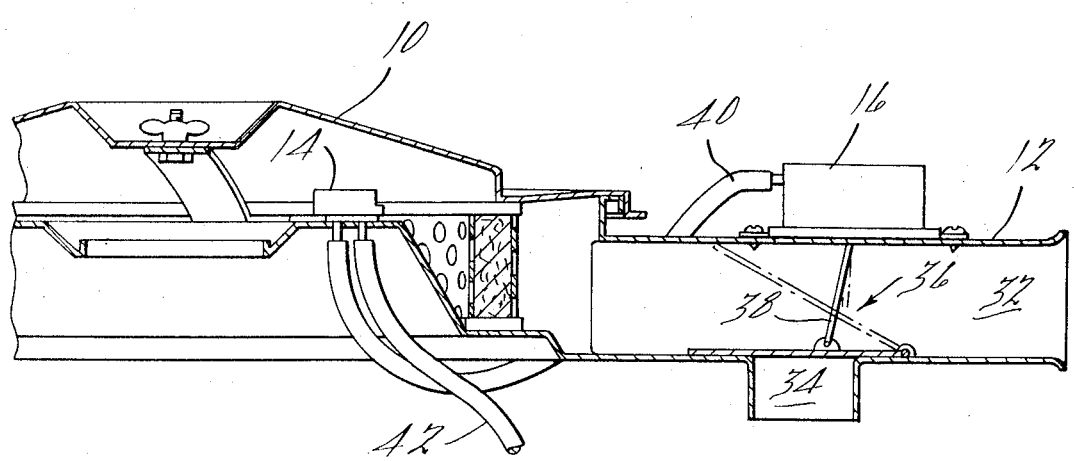
FIG. 2, is a side view, partially in section of the arrangement shown in FIG. 1.

Thermostatic vacuum valves of the subject type are popularly used in thermal modulated air cleaner systems for automotive engines of the type having a pivoted damper door controlled by a vacuum motor as shown in FIGS. 1 and 2. In these figures, air is supplied to an air cleaner 10 by a snorkel or air horn 12. The improved thermostatic valve 14 may be mounted within the air cleaner as shown and a vacuum motor 16 may be carried by air horn 12. Air horn 12 includes a cold air or ambient air input entrance 32 and a warm air input entrance 34 (shown in FIG. 2), the proportion of air entering each input entrance and contributing to the total air flow into the air cleaner is determined by the position of the damper door assembly generally indicated at 36. As shown in solid and dotted line the damper door assembly may move between a first position in which input entrance 34 is closed and a second position in which input entrance 32 is closed and to various positions intermediate these two extremes whereby mixing of cold and warm air may be accomplished. The damper door assembly 36 is operatively connected to vacuum motor 16 by means of a connecting rod or the like 38, which need not be described further in detail herein as such details are common knowledge to those familiar with this art. Vacuum motor 16 is connected to thermostatic valve 14 by means of a vacuum line 40, vacuum motor 16 being a vacuum utilization means which is operatively controlled by the thermostatic vacuum valve 14, by means of the vacuum interconnection 40. Thermostatic valve 14 is connected to a source of vacuum by means of a second vacuum line or conduit 42 which ultimately connects to a suitable source of vacuum. In such a system, mixing of warm and cold air going to the engine carburetor is accomplished by means of the modulating effect of the thermostatic valve 14 on the operation of vacuum motor 16 to effect positioning of damper assembly 36.

Figure 3:
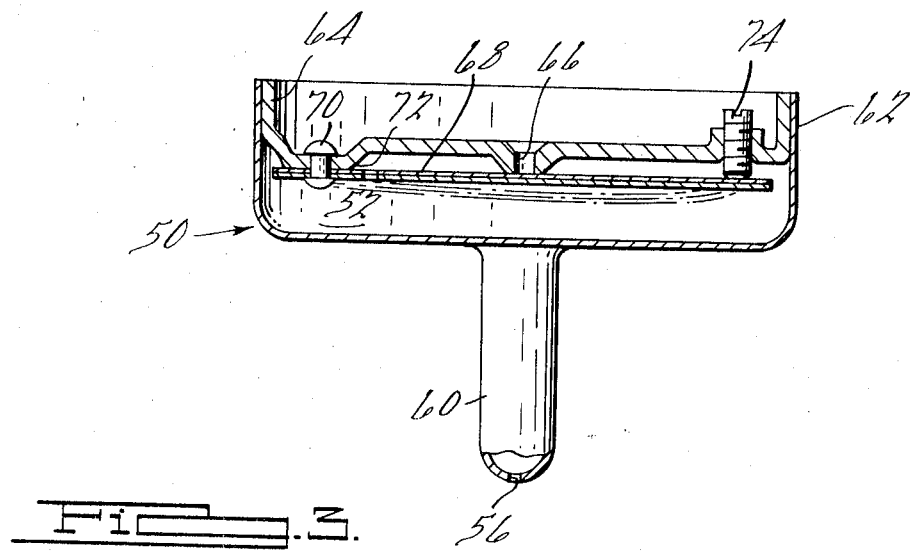
FIG. 3, is a cross sectional view of the thermostatic vacuum valve according to the invention.
Figure 4:
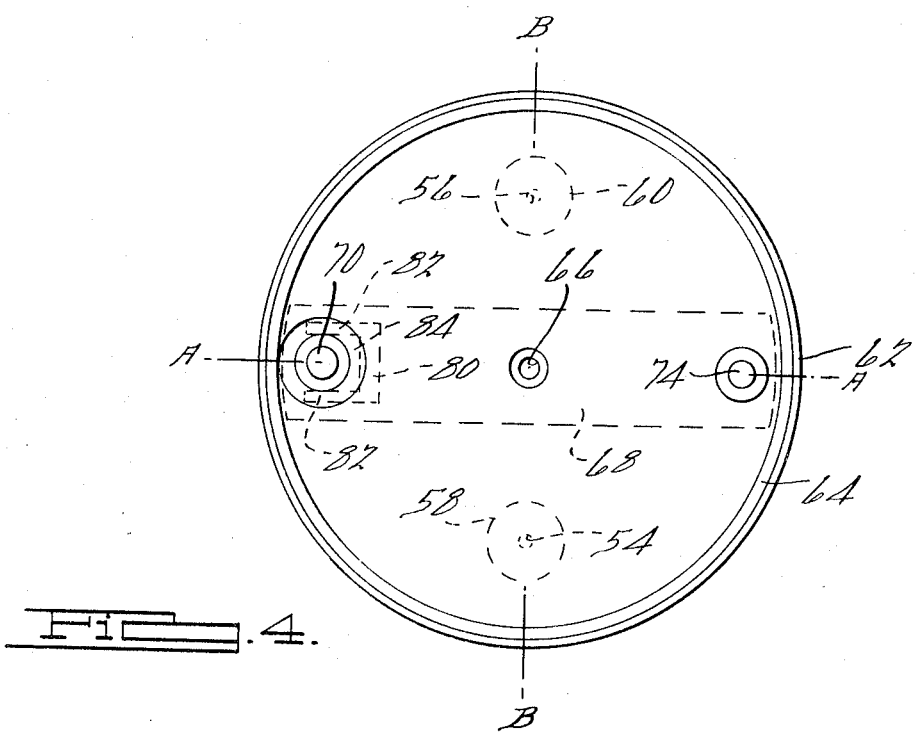
FIG. 4, is a top elevational view of the valve of FIG. 3.
Figure 5:
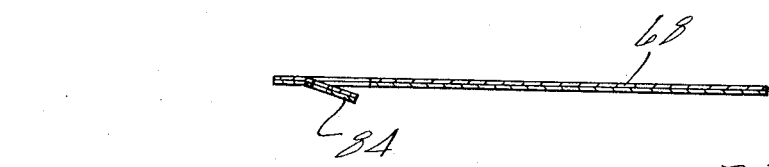
FIG. 5, is a side elevation of a bimetal element according to the invention.

Referring now to FIGS. 3, 4 and 5, the thermostatic vacuum valve of the invention will be described in more detail. FIGS. 3 and 4 show the body 50 of a vacuum valve which defines a vacuum flow chamber 52, an inlet vacuum port 54 for connecting the chamber to a source of vacuum and an outlet vacuum port 56 for connecting the chamber with a vacuum utilizing means as described hereinabove. These vacuum ports are preferably incorporated at the ends of two elongated tubes 58 and 60 at the bottom of the valve body as shown. The valve body itself is comprised of a bottom cup-like portion 62 including the two legs or tubes 58 and 60 and a nesting upper cup-like cover 64 clinched or press fit into the bottom cup-like body 62. Cover 64 has a central opening or bleed port 66 formed therein with a raised seat on the underside of cover 64 protruding into vacuum flow chamber 52. An elongated flat bimetal strip 68 is attached to the underside of cover 64 by means of a rivet 70 at one end on a raised portion or seat 72 of cover 64. Bimetal 68 extends underneath and underlies central bleed port 66 having a central portion of the bimetal exposed thereto and terminates at an opposite end which rests against an adjustment screw 74, the screw protruding downwardly through cover 64 as shown. Adjustment screw 74 may be raised or lowered to effect calibration of the bimetal strip and thereafter sealed with epoxy. Bimetal strip 68 is positioned with the low deflection side oriented toward cover 64 in this particular embodiment.

It is important in the most preferred embodiment of the invention that the inlet and outlet tubes 58 and 60 be located along centerline B—B which is at a right angle to centerline A—A as shown in FIG. 4. If the tubes are located on centerline B—B, the inlet and outlet tubes can be interchanged with no effect on the temperature-vacuum characteristics of the valve. If the ports are located on centerline A—A, the vacuum vs. temperature will change when the inlet and outlet connections are interchanged. It is desirable to not have to orient the inlet and outlet hoses with respect to the valve, when assembling the valve into a system. This, of course, lowers the cost of assembly.

In operation of the thermostatic vacuum valve, source vacuum is supplied to inlet 54 and if bleed port 66 is closed or substantially closed due to the nearness of bimetal 68, the vacuum will also appear at outlet 56. If, however, the temperature of the air entering the vent varies sufficiently and rises such as to cause bimetal element 68 to arch or bow to the position shown in phantom in FIG. 3, the movement of the bimetal element away from bleed port 66 will open the port and relieve the vacuum at outlet vacuum port 56 because of the admission of atmospheric air to the vacuum flow chamber. At intermediate positions of the bimetal strip the extent of the vacuum at outlet 56 will be modulated in accordance with the temperature of the small quantity of air admitted by way of bleed port 66.

Further features of the bimetal mounting and arrangement according to this invention are shown in FIGS. 4 and 5. As can be seen from FIG. 4 bimetal strip 68 contains a generally U-shaped cut out 80 due to portion 84 being bent downwardly to provide flexibility upon mounting by means of a hinge-like action which occurs in the vicinity of the cut-out portion. The cut-out portion has also been found to assure uniform bowing across the length of the bimetal strip. Uniform bowing is necessary to provide proper valving action at the bleed port. Other equivalent cut-out shapes will of course be obvious to provide the hinge-like action. Arms 82 of the U-shaped cut out may be oriented toward either end of the bimetal strip. Also, if portion 84 of the bimetal strip intermediate the arms is bent downward from the plane of the bimetal as shown in FIG. 5, a pretension effect is provided when the bimetal is mounted in the vacuum chamber assuring the forcing of the free end of the bimetal against set screw 74 for improved deflection positioning.

In a typical valve adopted for automotive use when the temperature is below, for example 58°-65° F., bleed port 66 will be substantially covered by bimetal 68 and very little air will leak into vacuum chamber 52. As the temperature increases, bimetal 68 will bow to assume the shape as shown by the dotted line. When the bimetal bows, more air will pass through bleed port 66 and impinge on the bimetal. If the source vacuum remains substantially constant, the control vacuum will vary proportionally to the amount of deflection as the bimetal bows in a downward direction.

When the bimetal is supported at both ends as in this design, it does not vibrate and create the objectionable aforementioned buzzing noise. Furthermore, cover plate 64 also acts as a protective cover for the bimetal element. The bimetal may then be very thin, for example, 0.007 inches. Cover plate 64 acts as a radiator and heat absorber transmitting heat to the thin bimetal very rapidly. This allows the valve to follow very rapid changes in ambient temperature. Also, when the cover plate 64 is made of a thicker metal than body 62 and designed for an interference of it, the resultant assembly provides a simple economical leak-free vacuum chamber.

It will be apparent that various changes and modifications may be made in the above described construction without departing from the spirit and the intent of the invention.

Having described the invention, what is claimed is:

1. A thermostatic vacuum valve comprising:
   a valve body having an interior space defining a vacuum flow chamber;
   an inlet vacuum port in said body for connecting the chamber to a source of vacuum;
   an outlet vacuum port in said body for connecting the chamber with a vacuum utilizing means;
   an atmospheric bleed port in said body for admitting air into the vacuum chamber; and
   a flat bimetal strip mounted in said chamber, with an intermediate portion thereof underlying the bleed port, one end of the strip being fixedly secured to one side of the bleed port, the other end being slidably supported to the other side of the bleed port whereby the flow of air through the port into the chamber is modulated by the underlying portion of the strip as it deflects according to temperature variations to move toward and away from the bleed port.

2. The valve according to claim 1 wherein the bimetal strip contains a generally U-shaped cut-out in the fixedly secured end to provide a hinging action when the strip deflects, the open arms being oriented toward one of the ends of the strip.

3. The valve according to claim 2 wherein the portion of bimetal intermediate the U-shaped cut-out is bent out of the plane of the strip to provide a spring biased effect when the strip is mounted.

4. The valve according to claim 1 wherein the valve body comprises:
   a body cup-like portion;
   an upper cup-like cover portion nested into the bottom portion to form the vacuum chamber therebetween;
   the bleed port is in the cover; and
   the bimetal strip is secured to the underside of the cover.

5. The valve according to claim 4 wherein the upper cup is carried within the bottom cup to provide a vacuum chamber therebetween, contact between the two cups being by interference of it, the upper cup being of a thicker gage material than the bottom cup.

6. The valve according to claim 4 wherein the bleed port is substantially centrally located in the cover and includes an interior seat-like area surrounding the opening and extending into the vacuum chamber.

7. The valve according to claim 6 wherein the fixedly secured end of the strip is attached to a raised portion of the underside of the cover.

8. The valve according to claim 1 wherein the bimetal strip is positioned with its low deflection side oriented toward the bleed port.

9. The valve according to claim 1 wherein the input and output ports are located on a centerline at a substantially right angle to the longitudinal centerline of the mounted bimetal strip.

* * * * *